United States Patent [19]

Heckles et al.

[11] 4,085,081
[45] Apr. 18, 1978

[54] "SMOKE-SUPPRESSANT POLYHALOCARBON POLYMER COMPOSITIONS CONTAINING AS PLASTICIZER AN UNSATURATED DERIVATIVE OF AN ESTER POLYOL"

[75] Inventors: John S. Heckles, Lancaster, Pa.

[73] Assignee: Armstrong Cork Company, Lancaster, Pa.

[21] Appl. No.: 765,638

[22] Filed: Feb. 4, 1977

[51] Int. Cl.$^2$ .............................................. C08K 5/10
[52] U.S. Cl. ........................ 260/31.4 R; 260/31.8 R; 260/31.8 C; 260/45.7 RT; 260/45.85 R; 260/45.85 T
[58] Field of Search ................... 260/31.4 R, 45.85 R, 260/45.85 T

[56] References Cited
U.S. PATENT DOCUMENTS

| 2,539,207 | 1/1951 | Safford | 260/31.4 R |
| 2,637,714 | 5/1953 | Emerson et al. | 260/31.4 R |
| 2,786,041 | 3/1957 | Dazzi | 260/31.4 R |
| 2,838,428 | 6/1958 | Bohrer | 260/31.4 R |
| 2,958,706 | 11/1960 | Hurwitz et al. | 260/31.4 R |
| 2,975,152 | 3/1961 | Hurwitz et al. | 260/31.4 R |
| 3,285,868 | 11/1966 | Hecker et al. | 260/45.85 R |
| 3,454,514 | 7/1969 | Baum | 260/45.85 T |
| 3,533,974 | 10/1970 | Pultinas | 260/31.4 R |
| 3,577,480 | 5/1971 | Thorpe | 260/45.85 R |

Primary Examiner—Herbert J. Lilling

[57] ABSTRACT

Smoke-suppressant polymer compositions are described comprising a polyhalocarbon resin and an organic ester of the formula (a) ROC(O)C(O)OR' wherein R and R' can be the same or different and are $C_1$ to $C_8$ alkyl, $C_6$ to $C_{12}$ cycloalkyl or $C_1$ to $C_8$ alkoxy-substituted $C_1$ to $C_8$ alkyl;

(b) $RC(CH_2O)_3(CH_2CH=CH_2)_{3-x}(C(O)CH_3)_{3-y}$ wherein R is defined above and x and y are 1 or 2 with the proviso that $x \neq y$;

(c) $[CH_3C(O)CH_2CH_2C(O)O]_xR''$ wherein x is defined above and R" is $C_1$ to $C_8$ alkyl, $C_6$ to $C_{12}$ cycloalkyl, $C_1$ to $C_8$ alkoxy-substituted alkyl, $C_2$ to $C_8$ alkylene or $C_2$ to $C_8$ oxyalkylene; or (d) mixtures thereof.

9 Claims, No Drawings

"SMOKE-SUPPRESSANT POLYHALOCARBON POLYMER COMPOSITIONS CONTAINING AS PLASTICIZER AN UNSATURATED DERIVATIVE OF AN ESTER POLYOL"

BACKGROUND OF THE INVENTION

1. Field of the Invention

This invention relates to smoke suppressed polymeric compositions. More particularly it relates to flame-retardant and low-smoke vinyl resin compositions.

2. Description of the Prior Art

There is a growing concern about the fire safety of a variety of consumer products. As such, a growing recognition that injuries and fatalities arising from fire and flame accidents are not primarily due to burns, but rather to smoke, gases, and oxygen deficiency. Those polymeric compositions containing relatively high percentages of halogen, either chemically attached to the polymer substrate or physically added as plasticizers, are generally considered flame retardant. In this respect, an important flame-retardant, halogen-containing polymer is poly(vinyl chloride). PVC, in its rigid form, is often used in buildings, aircraft, and the like. Rigid vinyl chloride, while being an acceptable flame retardant, has much higher levels of smoke production than considered desirable. In its plasticized form, as in fabrics, upholstery, and surface coverings, additional flammability and smoke generating problems are created whose alleviation has to date been subject to enormous research and development effort. In this respect, a myriad of inorganic materials have been found to function as flame retardants in poly(vinyl chloride)-based compositions. Antimony oxide-containing vinyl compositions have always been regarded as generally flame retardant, although not necessarily smoke retardant. Other metal oxides have served to diminish the disadvantages of antimony oxide in this respect; however, oxides such as calcium oxide and zinc oxide have been noted as detrimental when used in urethane systems so as to partially replace antimony oxide. In U.S. Pat. No. 3,957,723, Lawson et al, it has been disclosed that poly(vinyl chloride) systems containing zinc oxide with aluminum oxide trihydrate are of reduced flammability and diminished smoke intensity. Other PVC-based compositions have been noted to be fire and smoke retardant by the addition of zinc tungstate (see U.S. Pat. No. 3,901,850). Generally, it has been recognized that the incorporation of various mineral flame retardants in a polymer composition results in the diminished flammability of the polymers. But, concurrently, the emission of increased quantities of smoke occurs as a result of the increased tendency of the polymer to smolder. It has, therefore, been desirable to have additives, in addition to the flame retardant mineral ones, that are active in suppressing smoldering polymers. As a result, a variety of mineral/organic flame retardant/smoke retardant compositions have been found to achieve this result. For example, Elcik, in U.S. Pat. No. 3,983,290, has disclosed that zinc borate is useful in PVC compositions containing a phosphate ester plasticizer. Metal/organic complexes, such as ferrocenes, have also found to be similarly effective in this regard. It has been subsequently established that smoke retardant additives for vinyl chloride polymers should adhere to a number of conditions to make them practically usable. The smoke-retardant additive should be effective within the range of combustion temperatures of the poly(vinyl chloride) polymer composition so as to inhibit smoldering. Further, smoke-retardant additives should be sufficiently compatible with all constituents of the polymer composition, that is, resinous polymers, stabilizers, plasticizers, and the like, both primary and secondary, antioxidants, flame retardants and others, to remain incorporated under conditions of formulation and use. Additionally, the additives should be sufficiently compatible so they can be mixed and fused into coherent, homogeneous material with good stability and will not separate easily from the final compounded formulation when a stress is imposed upon the system, such as occurs during processing. Chemical stability is a further significant aspect of compatibility of the additive in the formulation, and such should not enhance degradation during processing nor by normal aging.

SUMMARY OF THE INVENTION

It is an object of this invention to provide a new smoke-retardant composition which can be used alone or together with other additives in polyhalocarbon resins to reduce emission of smoke and promote enhanced flame retardancy upon the burning of such compositions.

It is a further object of this invention to provide a smoke-retardant additive for poly(vinyl chloride) compositions which is compatible with the other constituents of the polymeric composition under conditions of formulation and use.

It is another object of the present invention to provide smoke-retardant properties without undue impairment of critical polymer properties in poly(vinyl chloride) resinous compositions.

These and other objects of the present invention have been attained by the incorporation of a high oxygen content organic ester plasticizer into a vinyl chloride polymer composition.

DESCRIPTION OF THE PREFERRED EMBODIMENTS

The flame-retardant and smoke-suppressed composition of the present invention can be obtained by the incorporation of a high oxygen content organic ester plasticizer into a halocarbon polymeric composition comprising a vinyl chloride resin and stabilizer. As a result, the polymeric composition formed is flame retardant and substantially reduced in smoke generation in both the flaming and the non-flaming modes.

High oxygen content plasticizers for use as additives in vinyl chloride and vinylidene chloride rigid and plasticized polymer compositions in accordance with the present invention comprise various alkyl and alkoxy organic esters. The term "high oxygen content" as used herein is related to di-2-ethylhexyl phthalate (DOP), one of the most common plasticizers of the polyhalocarbons. This material has an oxygen content of 16%. The high oxygen content plasticizers of this invention are those having an oxygen content of greater than that of DOP, e.g. 16%. For example, the high oxygen content oxalate ester plasticizer di-2-ethylhexyl oxalate has an oxygen content of 24.8%. The high oxygen content acetate ester plasticizer, trimethanol propane monoallyl ether diacetate, has an oxygen content of 33.6%. The high oxygen content levulinate plasticizer, ethyl levulinate, has an oxygen content of 33%.

In one embodiment of the present invention, the high oxygen ester-type oxalate plasticizers have the general formula

ROC(O)C(O)OR' wherein R and R' can be the same or different and are $C_1$ to $C_8$ alkyl or $C_1$ to $C_8$ alkoxy substituted $C_1$ to $C_8$ alkyl.

The method used to prepare the oxalate plasticizers is particularly set forth in the prior art and can generally be described as the ester interchange reaction between an alcohol and diethyl oxalate. Illustrative of the alkyl alcohols useful in this ester interchange reaction are butyl, ethyl hexyl, cyclohexyl, 2-ethoxyethyl (Cellosolve) and 2-butoxyethyl (Butyl Cellosolve) alcohols. The following equation illustrates their preparation:

$$H_5C_2OC(O)C(O)OC_2H_5 + ROH \rightarrow$$
$$ROC(O)C(O)OR + 2 C_2H_5OH$$

wherein R is $C_1$ to $C_8$ alkyl or $C_1$ to $C_8$ alkoxy-substituted alkyl as illustrated by $C_4H_9$, $C_8H_{17}$, $C_6H_5$, $C_2H_5OCH_2CH_2$ and $C_4H_9OCH_2CH_2$. See Caruthers et al, J. Amer. Chem. Soc. 52, 3292 (1930).

Mixed esters may also be prepared by this route with slight modification. The mixed esters were made using an excess of ethyl oxalate and recovering the mixed oxalate by fractional distillation. Preparation of 2-(2-butoxyethoxy)ethyl-ethyl oxalate illustrates this type of preparation.

$$C_4H_9O(CH_2)_2O(CH_2)_2OH + 2$$
$$H_5C_2OC(O)C(O)OC_2H_5 \rightarrow$$
$$C_4H_9O(CH_2)_2O(CH_2)_2OC(O)C(O)OC_2H_5 +$$
$$C_2H_5OH$$

The dialkyl and alkoxy oxalates and mixed alkyl and alkoxy oxalates were used as the plasticizer in the standard PVC formulations and Brabender viscosities of the fused batches were low, indicating the oxalates were efficient plasticizers. The pressed samples were clear, indicating acceptable compatibility.

These oxalate ester plasticizers are effective in diminishing the smoke from polyhalocarbon formulations in which they are incorporated in an amount based on parts per 100 parts of polyhalocarbon resin of from 1 to 80 parts, preferably 5–50 parts, most preferably 20–40 parts.

In a second embodiment of the present invention, the high oxygen ester-type acetate plasticizers of use in the low smoke polyhalocarbon formulations have the general formula $$RC(CH_2O)_3(CH_2CH=CH_2)_{3-x}(C(O)CH_3)_{3-y}$$

wherein R is defined above and x and y are 1 or 2 with the proviso that $x \neq y$.

The general preparation of these alkeneoxy esters is by the acetylation of the respective alcohol with acetic anhydride with a small amount of base catalyst.

They are useful as low-smoke plasticizers in polyhalocarbon formulations in an amount based on 100 parts of resin of 1 to 80 parts, preferably 5 to 50 parts, most preferably 20–40 parts.

A further embodiment of the present invention is the use of the high oxygen ester-type levulinates as polyhalocarbon plasticizers. These low-smoke plasticizers have the formula $$[CH_3C(O)CHCH_2C(O)O]_xR''$$

where x is as previously defined and R'' is $C_1$ to $C_8$ alkyl, $C_6$ to $C_{12}$ cycloalkyl, $C_1$ to $C_8$ alkoxy-substituted alkyl, $C_2$ to $C_8$ alkylene or $C_2$ to $C_8$ oxyalkylene. The majority of levulinic acid esters used in the composition of the present invention were prepared by direct esterification of alcohol-acid with dibutyl tin dioctoate catalyst with a xylene azeotrope, e.g. 2-butoxyethyl (Butyl Cellosolve), 2-(2-ethoxyethoxy) ethyl (Carbitol solvent) and 2-(2-butoxyethoxy) ethyl (Butyl Carbitol) levulinates. Diethylene glycol and butanediol dilevulinates were also prepared. However, an alternate procedure was also employed. This preparative method was used to prepare butyl cellosolve levulinate (2-butoxyethoxy levulinate). See Huffman et al, U.S. Pat. No. 3,203,964.

The polyhalocarbon resin systems containing the low-smoke levulinate plasticizers are useful in an amount based on 100 parts of polyhalocarbon resin of from 1 to 80 parts, preferably 5 to 50 parts, most preferably 20–40 parts.

Halocarbon polymers used in this invention include homopolymers, copolymers and blends of homopolymers and/or copolymers, such as illustrated by various poly(vinyl chloride) resins. These copolymers may contain from 0 up to about 50% by weight of at least one other olefinically unsaturated monomer, more preferably at least one other vinylidene monomer (i.e. monomer containing at least one terminal $CH_2=C$ group per molecule) copolymerized therewith, more preferably up to about 20% by weight of such monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, -methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-,β- and α-cyanopropyl acrylates and the like; olefinically unsaturated carboxylic acids and esters thereof; including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically-unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; bis(β-haloalkyl)alkenyl phosphonates such as bis(β-chloroethyl) vinyl phosphonate and the like.

The halocarbon polymers may be prepared by any method known to the art such as by emulsion, suspension, bulk or solution polymerization. The additive compounds may be mixed with the polymer emulsion, suspension, solution or bulk mass before monomer recovery and/or drying. More preferably, the compounds may be mixed with dry granular or powdered polymers. The polymer and compound may be mixed thoroughly in granular or powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound, but will generally be in the range of about 300° to 400° F. and 2 to 10 minutes.

Most of the commercially available PVC plasticizers can be successfully incorporated into these compositions. The common types include monomeric or polymeric esters of adipic, azelaic, oleic, phosphoric, sebacic, stearic, phthalic or trimellitic acid and of allyl alcohol, glycerol, butanol, isobutanol, pentanol(s), (methyl) cyclohexanol(s), 2-ethylhexanol, octanol(s), benzyl alcohol, tetrahydrofurfuryl alcohol, propylene glycol, diethylene glycol, dipropylene glycol, triethylene glycol, tripropylene glycol, polyethylene glycol(s) or polypropylene glycols. The choice of type, of course, will be dictated by the desired level of properties and performance of the end product.

Suitable stabilizers for use in the present composition include those conventionally used for stabilizing the polymers employed e.g. barium-cadmium stearate, laurate or oleate (7 to 15% metal content), (e.g. Ferro 75-001, trademark); barium-zinc octoate (e.g. Synpron 744, trademrk Synthetic Products Company); liquid epoxy resin (e.g. bis[3,4-epoxy-6-methylcyclohexyl-methyl] adipate, Ciba CY 178, trademark); phosphate chelator ( e.g. tri[nonylated phenyl] phosphite, Mark C, trademark); ultraviolet absorber (e.g. 2-[2'-hydroxyphenyl-5-ethyl] benzotriazole, Tinuvin 328, trademark); antioxidant (e.g. tetrakis [methylene 3-(3',5'-di-t-butyl-4' hydroxyphenyl) propionate] methane, Irganox 1010, trademark).

The vinyl chloride and vinylidene chloride polymer compositions of this invention may contain the usual compounding ingredients known to the art such as fillers, opacifiers, lubricants, processing aids, impact modifying resins, antioxidants, and the like.

The term flaming and non-flaming modes is derived from using the NBS Smoke Density Chamber Test. This test is described in great detail in the article by D. Gross, J. J. Loftus, and A. F. Robertson, ASTM Special Technical Publication 422, pages 166–204 (1969). In this test, the maximum specific optical density, $D_m$, corrected for soot deposits on smoke density chamber cell windows is obtained. The examples illustrated herein disclose the average smoke value per gram, SV/g or $D_m$(corr)/g of each sample tested for both flaming (f) and non-flaming (s) modes. The use of $D_m$(corr) or SV/g allows for the correction of the smoke density value for sample weight and, therefore, is valid for samples which are quite thin but have about the same weight. A maximum average $D_m$(corr) value of 450, as determined in the NBS Smoke Density Chamber, has been adopted as a regulation value for interior finishes, including floorings and the like, by the U.S. Department of Health, Education and Welfare.

In the examples that follow, smoke generated by the poly(vinyl chloride) resin-containing compositions was measured by the method described above using an instrument designated Model 4-5800, Aminco-NBS Smoke Density Chamber, American Instrument Company.

Test samples were made by blending the smoke suppressant composition with the thermoplastic resins upon weight basis in terms of parts per hundred of resin (PHR) in typical formula well known in the industry.

Additives are blended with the thermoplastic resins by milling at a temperature of about 160° to 170° C. for five to ten minutes. The sheets were removed from the mill, allowed to cool, and test samples were then cut from the sheet. Sheets obtained in this manner were approximately 14 inches wide by about 0.020 inches in thickness. Test samples for smoke determinations were cut from the sheets produced in this manner.

In accordance with the test procedure mentioned above, each sample was exposed to an energy flux of 2.5 w/cm$^2$ from a radiant heater under flaming conditions. Flames from a multi-directional propane burner impinged upon the sample and then into the trough at the bottom of the sample altered during these measurements.

The sample was exposed until a minimum transmittance value was obtained. After the smoke had been flushed from the cabinet, the residual attenuation of the light beam, caused by deposits on the windows in the test chamber, was recorded and a correction applied to the maximum absorbence value.

Specific optical densities were then normalized with respect to unit surface area of the sample ($D_m$). The specific optical densities are defined by the following expression: $D_m(\text{corr}) = V/A'L \times A \max. (\text{corr})$ where V equals test chamber volume; L equals optical path length; A' equals surface area of the sample; A max. (corr) equals A max. minus $A_w$, A max. (corr) minus maximum corrected absorbence during the test, A max. minus maximum measured absorbence during the test, $A_w$ minus absorbence caused by deposits on the window. In order to set forth a clear understanding of the invention, the following specific embodiments are described.

EXAMPLE 1

Dibutyl Oxalate (Bu-Oxalate)

Diethyl oxalate 81g (.55 mol), n-butyl alcohol 89g (1.2 mol) and 1.2g dibutyl tin dioctoate were heated 6 hours 100°–164° under a slight nitrogen pressure while collecting ethanol, 47g, at the top of a Vigreaux column and returning butyl alcohol to the reaction. Dibutyl oxalate was collected in fr 2, 96°–100° 1 mm. By gc fr 2 contained 89% dibutyl oxalate.

EXAMPLE 2

Diethylhexyl Oxalate (EH-Oxalate)

Diethyl oxalate 56g (.38 mol), 119g (.92 mol) ethyl hexanol and 0.14g dibutyl tin dioctoate were heated 5 hours 117°–181° collecting 33g ethanol and returning reactants to reaction. Diethylhexyl oxalate was collected in fr 3, 133°–139° 1 mm (100% EH oxalate ester by gc). Yield 96g, 78%.

EXAMPLE 3

Di-2-Butoxyethyl Oxalate (BE-Oxalate)

Diethyl oxalate 117g (.8 mol), 208g (1.76 mol) 2-butoxy ethanol (Butyl Cellosolve) and .25g dibutyl tin dioctoate were heated 7 hours 127°–163° collecting 63g ethanol distillate at the top of a Vigreaux column. Di-2-butoxyethyl oxalate was collected in fr 3, 131°–132° 1 mm. Fr 3 was 100% BE-oxalate by gc. Yield was 177g, 79%.

EXAMPLE 4

Dicyclohexyl Oxalate (CH-Oxalate)

Diethyl oxalate 121g (.83 mol), 183g (1.83 mol) cyclohexanol and 0.23g dibutyl tin dioctoate were heated 8 hours 123°–165° under a slight nitrogen pressure while collecting 65g ethanol at the top of a Vigreaux column and returning reactants to the reaction flask. Dicyclohexyl oxalate was collected in fr 3, 129°–130° 1 mm, 99% CH-oxalate by gc. Yield was 131g, 62%.

EXAMPLE 5

Di-2-Ethoxyethyl Oxalate (EE-Oxalate)

Diethyl oxalate 248g (1.7 mol), 382g (4.25 mol) 2-ethoxyethanol (Cellosolve solvent) was heated 9 hours 115°–152° under a slight nitrogen pressure while collecting 189g ethyl alcohol at the top of a Vigreaux column. EE-oxalate was collected in fr 4, 118°–119° 1 mm, 100% product by gc and in fr 5 119°–120° 1 mm, 98% product by gc. Yield was 317g, 80%.

EXAMPLE 6

2-(2-Ethoxyethoxy)Ethyl-Ethyl Oxalate (EEE-E Oxalate)

Diethyl oxalate 318g (2.18 mol), 194g (1.45 mol) 2-(2-ethoxyethoxy) ethanol (Carbitol solvent) and dibutyl tin dioctoate were heated 6 hours at 128°–156° while collecting 63g distillate (95% ethanol by gc). Mixed EEE-E oxalate was collected in fr 3, 114°–120° 1 mm, 99% EEE-E oxalate by gc. Yield was 204g, 60%.

EXAMPLE 7

2-(2-Butoxyethoxy)Ethyl-Ethyl Oxalate (BEE-E Oxalate)

Diethyl oxalate 744g (5.1 mol), 486g (3 mol) 2-(2-butoxyethoxy) ethanol (Butyl Carbitol) and 1.6g dibutyl tin dioctoate were heated with a slight nitrogen pressure 4 hours at 122°–154° while collecting 137g distillate (98% ethanol by gc). Reaction product was washed with sat. NaHCO₃, water, dried with anhydrous MgSO₄ and distilled. BEE-E oxalate was collected in fr 3, 131°–138° 1 mm, 100% BEE-E oxalate by gc. Yield was 456g, 58%.

EXAMPLE 8

Trimethylolpropane Diallyl Ether Monoacetate

Trimethylolpropane (TMP) diallyl ether 59g (.2 mol), 31g (.3 mol) acetic anhydride and 8g pyridine reacted in stoppered flask 3-1/2 hours at R.T. Acetate product collected in fraction 2, 95°–83° 1 mm, 98% acetate product by gc. Yield 59g, 87%.

EXAMPLE 9

Trimethylolpropane Monoallyl Ether Diacetate

TMP monoallyl ester 57g (0.3 mol), 92g (0.9 mol) acetic anhydride and 12g pyridine mixed in stoppered flask and held 3½ hours. Reaction 90% acetate product by gc. Reaction washed with dil. HCl, sat. NaHCO₃, water, dried with MgSO₄ and distilled. Acetate product collected in fraction 2, 99°–101° 1 mm, 100% acetate by gc. Yield 64g, 95%.

EXAMPLE 10

Diethylene Glycol Dilevulinate

Diethylene glycol 170g (1.6 mol), 371g (3.2 mol) levulinic acid and 1.5g dibutyl tin dioctoate were heated with a xylene azeotrope 5 hours 159°–192° to acid number (AN) 3.3 while collecting 70g distillate. Xylene was removed by distillation. Reaction product was washed with NaHCO₃ and water, dried with anhy. MgSO₄ and distilled. Ester product was collected in fr 2, 190°–217° 1 mm, 235g, 95% diester by gc.

EXAMPLE 11

Butanediol Dilevulinate 1,4-Butanediol 153g (1.4 mol), 394g levulinic acid (2.8 mol) and 1.5g dibutyl tin dioctoate were heated with a xylene azeotrope 5 hours 166°–193° to AN 3.4. Reaction product was washed with sat. NaHCO₃ and water, dried with anhy. MgSO₄ and distilled. Diester product collected in fr 2, 188°–207° 1 mm 190g, solidified on cooling. Butanediol dilevulinate recrystallized from pentane m.p. 51°–52°.

EXAMPLE 12

2-Butoxyethoxy Levulinate

2-Butoxyethanol (Butyl Cellosolve) 47.2g (0.4 mol) and 157g (1.6 mol) furfuryl alcohol were added to 422g (3.9 mol) 2-butoxyethanol and 7.2g conc. HCl over 1½ hours at 109°–114° and held at 108° for an additional 1½ hours. Reaction product was neutralized with sat. NaHCO₃, washed with water, dried with anhy. MgSO₄ and distilled. 2-Butoxyethyl levulinate was collected in fr 2, 95°–106° 1 mm, 95% ester by gc.

EXAMPLE 13

2-(2-Ethoxyethoxy) Ethyl Levulinate 2-(2-Ethoxyethoxy) ethanol (Carbitol solvent) 342g (2.54 mol), 212g (0.82 mol) levulinic acid and 1.2g dibutyl tin dioctoate were heated with a xylene azeotrope 9 hours 175°–183° to AN 1.6 while collecting 44g water. Xylene was removed by distillation to a pot temperature of 210°. Ester product was washed with sat. NaHCO₃ and water, dried with anhy. MgSO₄ and distilled. Ester product was collected in fractions 2, 3 and 4, 125°–131° 1 mm, 387g, 74% yield. Fractions 2, 3 and 4 were 91% ester product by gc.

EXAMPLE 14

2-Butoxyethyl Levulinate

2-Butoxyethanol (Butyl Cellosolve) 354g (3 mol), 232g (2mol) levulinic acid and 1.5g dibutyl tin dioctoate were heated with a xylene azeotrope for 24 hours 151°–177° to AN 2.3 while collecting 42g water. Product was washed with sat. NaHCO₃ and water, dried with anhy. MgSO₄ and distilled. Ester product was collected in fr 2 and 3, 120°–131° 1 mm. Yield was 349g, 81%, 96% ester product by gc.

EXAMPLE 15

2-(2-Butoxyethoxy) Ethyl Levulinate 2-(2-Butoxyethoxy) ethanol (Butyl Carbitol) 363g (2.24 mol), 186g (1.6 mol) levulinic acid and 1.5g dibutyl tin dioctoate were heated with a xylene azeotrope 18 hours to AN 2.4 while collecting 33.5g water distillate. Ester product was washed with sat. NaHCO$_3$ and water, dried with anhy. MgSO$_4$ and distilled. Ester product was collected in fr 3 141°–153° 1 mm, 282g, 68%, 99% ester by gc.

Test samples of poly(vinyl chloride) were made up in a typical formula, well known in the industry, using heat and light stabilizers. The Masterbatch formulation is set forth below (additives are employed based on parts by weight per 100 parts of resin):

| Masterbatch Formulation | |
|---|---|
| PVC, Escambia 2160, Escambia Chemical copolymer of specific viscosity 0.02 by ASTM D-1243-60-B | 100 |
| Admex 710 (epoxidized soybean oil) | 1.0 |
| Synpron 744 (zinc octoate/barium phenate/arylphosphite) Trademark of Synthetic Products Company | 4.0 |
| High oxygen content organic ester plasticizer | Varied |

Processability, compatibility and thermal stability were observed while determining torque in meter-grams with a Brabender Plastograph at 300° F. Each batch was additionally pressed at 300°–320° F. to a 30–40 mil thickness. Long-term compatibility of these plasticizers was determined by visual observation of the Brabender mixed and pressed samples, noting whether the plasticizer exuded or bloomed from the sample. Observations on compatibility were made after storing the samples at ambient conditions for six months to one year.

NBS Smoke Density of Oxalate Ester Plasticized PVC[1]
ROC(O)C(O)OR'

| Ex. | R & R' | Brabender Viscosity m/g 295° | NBS Smoke Density, Dm (corr) | | |
|---|---|---|---|---|---|
| | | | Fl | S | Average |
| 16 | Butyl | 600 | 327 | 80 | 204 |
| 17 | Ethylhexyl | 925 | 349 | 328 | 339 |
| 18 | Cyclohexyl | 750 | 323 | 326 | 329 |
| 19 | 2-ethoxyethyl | 425 | 226 | 156 | 191 |
| 20 | 2-ethyoxyethyl + 0.6 phr zinc oxide | Not determined | 179 | 128 | 154 |
| 21 | 2-(2-butoxy-ethoxy)ethyl-ethyl + 0.6 phr zinc oxide | Not determined | 161 | 293 | 227 |
| 22 | 2-butoxyethyl | 775 | 289 | 295 | 292 |
| | Duplicate of above | Not Determined | 275 | 327 | 301 |
| 23 | 2-(2-ethoxy-ethoxy)ethyl-ethyl | 500 | 213 | 162 | 200 |
| 24 | 2-(2-butoxy-ethoxy)ethyl-ethyl | 810 | 228 | 300 | 264 |

[1]Plasticizer used at 35 phr. 0.8 phr Admex 710, and 2.0 phr Synpron 744 All samples exhibited good compatibility after compounding and forming. The sheets were clear and flexible.

NBS Smoke Density of Levulinic Acid Ester Plasticized PVC
[CH$_3$C(O)CH$_2$CH$_2$C(O)O]R$_x$ where x is 1 or 2

| Example | R mono- and dilevulinates[2] | x | Brabender Viscosity m/g 300° F. | NBS Smoke Density, Dm(corr) | | | Sample[1] Comment |
|---|---|---|---|---|---|---|---|
| | | | | fl | s | avg | |
| 25 | 2-butoxyethyl | 1 | 525 | 260 | 181 | 222 | c, flex. |
| 26 | 2-(2-ethoxyethoxy)ethyl | 1 | 525 | 287 | 192 | 240 | c, flex. |
| 27 | 2-(2-butoxyethoxy)ethyl | 1 | 575 | 258 | 320 | 289 | c, flex. |
| 28 | 2-(2-butoxyethoxy)ethyl + 2 phr ZnO | 1 | 600 | 214 | 243 | 229 | c, flex. |
| 29 | diethylene glycol | 2 | 650 | 236 | Not Determined | | ic., exudes |
| 30 | butylene | 2 | 535 | 258 | Not Determined | | ic., blooms |
| 31 | 2-ethoxyethyl | 1 | — | 261 | 162 | 213 | c. flex. |

[1]c - compatible, ic - incompatible, flex - flexible
[2]esters used at 38 phr

Smoke Density of Acetate Ester Plasticized PVC

| Plasticizer Example R"C(CH$_2$O)$_3$— | RC(CH$_2$O)$_3$(CH$_2$CH=CH$_2$)$_{3-x}$(C(O)CH$_3$)$_{3-y}$[1] | NBS Smoke Desnity | | |
|---|---|---|---|---|
| | | fl | s | avg |
| 32 | —(CH$_2$CH=CH$_2$)$_2$(C(O)CH$_3$) | 397 | 243 | 320 |
| 33 | —(CH$_2$CH=CH$_2$)$_2$(C(O)CH$_3$) + 1 phr zinc oxide | 242 | 158 | 200 |
| 34 | —(CH$_2$CH=CH$_2$)(C(O)CH$_3$)$_2$ | 408 | 197 | 303 |

[1]"R" = C$_2$H$_5$, plasticizers were used at 40 phr concentration.

As a comparative example to be used as related the compositions of the present invention, a number of formulations were compounded representative of prior art conventionally plasticized and low-smoke plasticized poly(vinyl chloride) formulas. All comparative plasticized compositions also used the above Masterbatch formula.

| Comparison | NBS Smoke Density | | |
|---|---|---|---|
| | fl | s | avg |
| di-2-ethylhexyl phthalate (36 phr) | 615 | 228 | 422 |
| butyl benzyl phthalate (30 phr) | | | |
| creasyl diphenyl phosphate (6 phr) | 672 | Not Determined | |
| butyl benzyl phthalate (36 phr) | 642 | Not Determined | |

What is claimed is:

1. A smoke-suppressant polyhalocarbon composition comprising a polyhalocarbon resin and from 1 to 80 parts by weight based on 100 parts of polyhalocarbon resin of an organic ester of the formula:

$$RC(CH_2O)_3(CH_2CH=CH_2)_{3-x}(C(O)CH_3)_{3-y}$$

where R is C$_1$ to C$_8$ alkyl, C$_6$ to C$_{12}$ cycloalkyl, or C$_1$ to C$_8$ alkoxy-substituted C$_1$ to C$_8$ alkyl, and $x$ and $y$ are 1 or 2 with the proviso that $x \neq y$.

2. The composition in accordance with claim 1 wherein said ester is 5 to 50 parts and additionally containing an oxide, hydroxide, or salt of zinc.

3. The smoke-suppressant composition in accordance with claim 1 wherein said polyhalocarbon resin is poly(vinyl chloride) homopolymer or copolymerized with up to about 50% by weight of at least one other olefinically unsaturated monomer.

4. The smoke-suppressant composition in accordance with claim 1 wherein R is ethyl, $x$ is 1 or 2, and $y$ is 1 or 2.

5. The smoke-suppressant composition in accordance with claim 4 additionally containing a smoke-suppressant amount of zinc oxide.

6. The smoke-suppressant composition of claim 4 wherein $x = 2$.

7. The smoke-suppressant composition of claim 6 additionally containing zinc oxide.

8. The smoke-suppressant composition of claim 4 wherein $x = 1$.

9. The smoke-suppressant composition of claim 8 additionally containing zinc oxide.

* * * * *